C. NORDSTROM.
CREAM SEPARATOR.
APPLICATION FILED SEPT. 24, 1908.

915,209.

Patented Mar. 16, 1909.
2 SHEETS—SHEET 1.

Witnesses

Inventor
C. Nordstrom
By Geo. E. Tew
Attorney

C. NORDSTROM.
CREAM SEPARATOR.
APPLICATION FILED SEPT. 24, 1908.
915,209.
Patented Mar. 16, 1909.
2 SHEETS—SHEET 2.
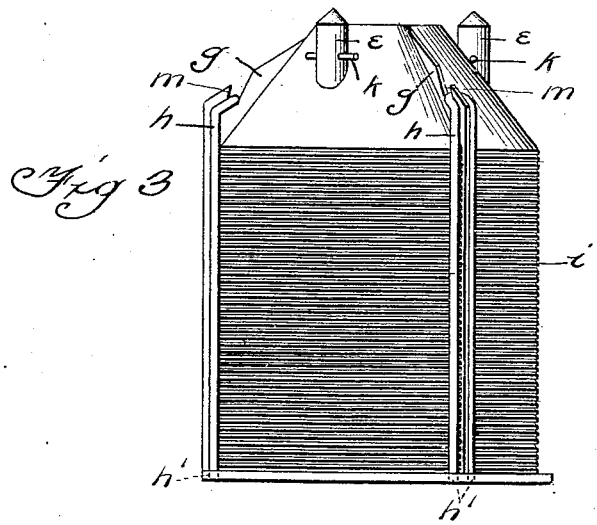
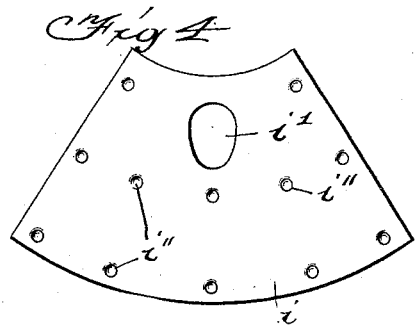
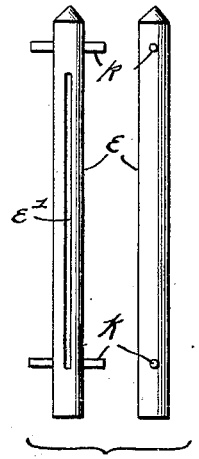
Witnesses
Inventor
C. Nordstrom
By
Attorney

UNITED STATES PATENT OFFICE.

CHARLES NORDSTROM, OF CHICAGO, ILLINOIS.

CREAM-SEPARATOR.

No. 915,209.     Specification of Letters Patent.     Patented March 16, 1909.

Application filed September 24, 1908. Serial No. 454,589.

*To all whom it may concern:*

Be it known that I, CHARLES NORDSTROM, a citizen of the United States, residing at Chicago, in the county of Cook and State of Illinois, have invented certain new and useful Improvements in Cream-Separators, of which the following is a specification.

This invention relates to centrifugal cream separators, and has for its object to provide a construction improved particularly with respect to the means for assembling and holding the disks upon the bowl and around the feed pipe which is at the center.

A characteristic feature of the structure is that the bowls are made of segmental sections mounted and assembled together upon a rigid structure, and capable of being readily applied or put in position, and securely held by simple devices as hereinafter described.

The invention will be hereinafter more fully described, and an embodiment thereof is illustrated in the accompanying drawings, but changes in the form, proportion, size, and other details may be made within the scope of the invention, which is not limited to the particular embodiment shown.

Figure 1:
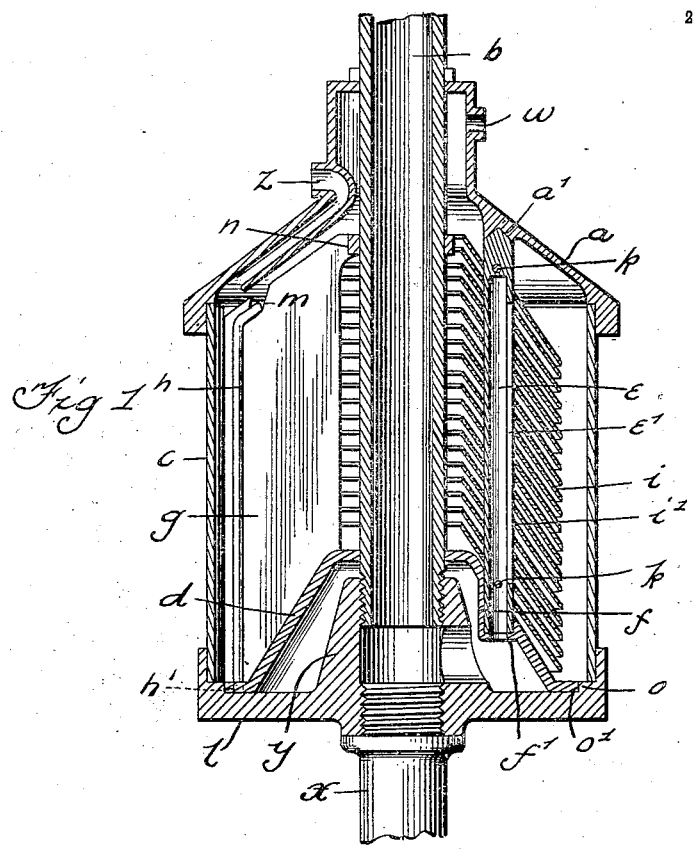
Figure 2:
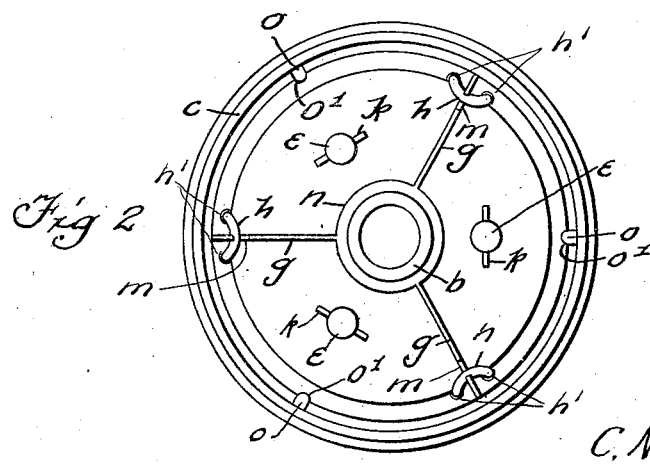

In the drawings, Figure 1 is a vertical, central longitudinal section of the separator constructed in accordance with the invention. Fig. 2 is a top view, the top of the casing being removed. Fig. 3 is a side view with the casing removed. Figs. 4 and 5 are details of a bowl segment and a distributing pipe respectively.

Referring specifically to the drawings, $a$ indicates the top of the bowl, $b$ the feed pipe at the center, and $c$ the shell of the bowl, resting upon the bottom $l$ which is supported on the spindle $x$. The whole milk enters at the top through the feed pipe $b$ into a bottom cone $d$, which rests upon the bottom $l$ of the bowl. The feed pipe $b$ is screwed into a hollow socket $y$ formed integral with the bottom $l$, and having an outlet into the chamber within the cone $d$.

Projecting upwardly from the cone $d$ is a series of distributing pipes $e$, from which the milk flows in between the bowl segments $i$, the cream finally flowing out at the top through an outlet $w$ in the neck of the casing, while the skimmed milk escapes through an outlet $z$, in consequence of the centrifugal action, and in a manner well understood. On the bottom cone $d$ is fastened a series of vertical radial wings $g$, the number of which can be two, three, or more, preferably three. These wings $g$ are connected at the top to a ring $n$ that fits the feed pipe $b$, and these wings serve to divide or separate the segments of the disks. The bottom cone is provided with sockets $f$ which receive the lower ends of the distributing pipes $e$ which rest on an offset $f'$ in the socket, the hole in the bottom of the socket being made to correspond with the hole in the distributing pipes $e$. These pipes are closed at the top and are pointed to fit recesses $a'$ in the under side of the bowl top, as shown. The distributing pipes are are also slotted as indicated at $e'$, the slots being turned outwardly when the pipes are placed in position.

On the pipes $e$ are placed the segments $i$ of the disks, the segments having holes $i'$ to receive the pipes. Pins $k$ are then put through the upper ends of the pipes, so the segments cannot come off.

The complete disks are formed by segments on the respective pipes, and each pipe $e$ with the segments thereon is placed between two of the wings $g$, and the pipe $e$ is forced down into the socket $f$; and similarly with the other parts. Staples $h$ are then placed in position, one on each wing, the bend of the staple at the top engaging in a notched end on the wing, and the lower end of the staple being pressed into holes $h'$ on the outer rim of the bottom cone. The notch $m$ on the wing slants outwardly, so that when the bowl is in motion the staples are forced down or locked by the centrifugal action. The staples hold the segments firmly in position, the branches of the staples being in contact with the outer edges of the segments on the respective sides of the wings. The inside structure of the separator, assembled as above stated, is then placed in the bowl, the shell of which is provided with ribs $o$ which fit in notches $o'$ in the outer rim of the cone $d$ and which rest against the outer edges of the disk segments $i$, and which thus serves to assist in holding the disks in position. The segments when put in position will form frustums or cones cut through by the wings. The disk segments are spaced apart by bosses $i''$ pressed therein.

When constructed as above described the parts may be made and assembled much cheaper than when the disks are made in one piece, the segments being readily stamped out and put in place to form segmental sections which can then be assembled and put in a bowl.

I claim:

1. A centrifugal separator including a bowl, a cover thereon, a hollow cone in the bottom of the bowl, distributing pipes communicating with the interior of the cone and projecting against the cover at their upper ends, frusto-conical disks mounted upon the cone, and in the bowl, and through which the distributing pipes extend, and fastening devices on the pipes, bearing against the upper disk.

2. A centrifugal separator including a bowl, a cone at the bottom of the bowl, having vertical wings, frusto-conical disk segments mounted upon the cone and between the wings, and fastening devices attached between the top of the wings and the cone and bearing against the outer edges of the segments, to hold the same in place.

3. A centrifugal separator including a bowl, a cone at the bottom thereof and having vertical wings projecting upwardly from the bowl and pipes projecting upwardly from the bowl between the wings, and frusto-conical disk segments located between the wings and having holes through which said pipes extend, and fastenings on the pipes to hold the segments in place.

4. A centrifugal separator including a bowl, a cone on the bottom thereof having vertical radial wings projecting upwardly therefrom, the wings having notches at the top, disk segments mounted between the wings, and staples hooked at the top in said notches and connected at the bottom to the cone and bearing against the outer edges of the segments to hold the same in position.

In testimony whereof, I affix my signature in presence of two witnesses.

CHARLES NORDSTROM.

Witnesses:
NELLIE FELTSKOG,
WM. J. ROBINSON.